United States Patent
Lempiö et al.

[11] Patent Number: 6,109,398
[45] Date of Patent: *Aug. 29, 2000

[54] SAFETY GEAR

[75] Inventors: Ilkka Lempiö, Lahti; Esko Aulanko, Kerava; Juha Tyllinen, Tervakoski, all of Finland

[73] Assignee: Kone OY, Helsinki, Finland

[*] Notice: This patent is subject to a terminal disclaimer.

[21] Appl. No.: 08/969,409

[22] Filed: Nov. 7, 1997

[30] Foreign Application Priority Data

Nov. 7, 1996 [FI] Finland ................................. 964484
Dec. 5, 1996 [FI] Finland ................................. 964903

[51] Int. Cl.⁷ .................................................. F16P 63/00
[52] U.S. Cl. ...................... 188/82.4; 188/181 A; 187/376
[58] Field of Search ............................ 188/181 A, 181 R, 188/37, 82.4, 82.1, 72.2, 71.7, 72.7; 187/372, 376, 368

[56] References Cited

U.S. PATENT DOCUMENTS

| | | |
|---|---|---|
| 859,718 | 7/1907 | Abbott ................................. 187/372 |
| 1,581,458 | 4/1926 | Lindquist ............................. 187/343 |
| 2,897,920 | 8/1959 | Falter .................................. 187/372 |
| 4,538,706 | 9/1985 | Koppensteiner ..................... 187/376 |
| 5,224,570 | 7/1993 | Fromberg . | |

FOREIGN PATENT DOCUMENTS

0490090 A1  6/1992  European Pat. Off. .
85/02169    5/1985  WIPO .

*Primary Examiner*—Robert J. Oberleitner
*Assistant Examiner*—Robert A. Siconolfi
*Attorney, Agent, or Firm*—Birch, Stewart, Kolasch & Birch, LLP

[57] ABSTRACT

A safety gear (1) comprising a frame provided with a braking surface, which, when the safety gear is braking, is pressed against a first guide surface of a guide rail. Mounted in the frame is a roller (3), which moves along a track in the safety gear. The track comprises at least a first gradient and a second gradient, the first gradient having a larger pitch angle than the second gradient. The roller is pressed against a second guide surface of the guide rail when the safety gear is braking. The roller (3) has a stronger grip on the track on the first gradient than on the second gradient.

18 Claims, 8 Drawing Sheets

SAFETY GEAR

FIELD OF THE INVENTION

The present invention relates to a safety gear.

DESCRIPTION OF THE BACKGROUND ART

Elevators are equipped with automatic braking devices acting as safety gears designed to stop the elevator if its speed rises too much. Conventionally, the braking device used is a gripper type brake that grips a guide rail. Generally, the safety gear is used to stop downward movement. Such a gripping brake can also be used to stop the elevator for other reasons, e.g. in a case where an error in operation results in the elevator leaving a door zone with doors open. The basic structure of a conventional brake gripping a guide rail, a safety gear, is as follows. The safety gear frame contains a hollow with a braking surface facing towards a guide rail placed in the hollow. Placed in the hollow is also a wedge or a roller, which, mounted on a track in the hollow, is driven against the elevator guide rail when the safety gear is activated. The elevator guide rail is placed between the braking surface and the wedge or roller. The track is so shaped that, when the wedge or roller moves on the track in the direction of the guide rail, the guide rail is pressed by the wedge or roller against the braking surface, thus producing a braking action that stops the elevator car. The safety gear can also be mounted on the counterweight.

The compression applied by the safety gear to the guide rail is set by means of a spring. Via the friction between the braking surface and the guide rail, the magnitude of the compressive force determines the deceleration of the elevator. The use of spring-loaded compression compensates for the variations in compressive force occurring during the deceleration. In the course of time, several different technical solutions for an elevator safety gear have been developed. A commonly used safety gear type is a large U-shaped spring made of spring steel, with a wedge which is driven between the ends of the spring when the safety gear is activated. Safety gears of this type are also often provided with a release wedge for easier disengagement from the guide rail. However, the U-shape of such a safety gear opens during the gripping action, which is why the braking surface has only partial contact with the guide rail. Further drawbacks with this type of safety gear are its large size and high price. Safety gears have also been developed in which the safety gear frame is relatively rigid and the springiness of the compression applied by the safety gear to the guide rail is achieved using separate springs. However, these safety gears comprise a large number of separate parts and they are more complex in composition. Such safety gears are lighter than earlier safety gear types, but like these, they are quite expensive. As the length of the safety gear is a significant factor affecting the size, operation, price and placement of the safety gear, in order to reduce the safety gear length, a roller track with a changing gradient has been used in some safety gears employing a roller to engage the guide rail. The purpose of the steeper gradient at the beginning of a track with changing gradient is to quickly eliminate the clearance between the guide rail and the friction surface of the safety gear in the initial stage of safety gear operation. The gradient of the first part of the track cannot be increased very much because a steeper track would result in jeopardising the ascent of the roller to the part of the track that produces the actual braking force or, to ensure the ascent of the roller to the part of the track that produces the braking force, in a necessity to move the roller using a larger force from the overspeed governor. However, the force obtained from the overspeed governor cannot be increased very much because even the regulations relating to elevator structure and safety impose certain upper and lower limits on the force generated by the overspeed governor for the triggering of safety gears.

SUMMARY OF THE INVENTION

To overcome the problems described above and to achieve a safety gear that is better than earlier types, an invention concerning a new type of safety gear is presented. The safety gear of the invention comprises a frame provided with a braking surface, which, when the safety gear is braking, is pressed against a first guide surface of a guide rail, a roller being mounted in the frame and being fitted to move along a track provided in the safety gear, said track comprising at least a first gradient and a second gradient, the first gradient having a larger pitch angle than the second gradient, which roller is pressed against a second guide surface of the guide rail when the safety gear is braking, a friction coefficient between the roller and the track being higher on the first gradient than on the second gradient.

The advantages achieved by the invention include the following:

The safety gear is relatively light and reliable in operation. The safety gear of the invention is also of a short construction and does not require much space, so it is easy to place in the elevator layout as well as easy to install. In particular, in spite of the short construction of the safety gear, its roller is reliably and quickly moved to the position where braking is started. As the clearance between the guide rail and the friction surface of the safety gear is eliminated as quickly as possible at an early stage of safety gear operation, the elevator speed cannot rise too much during free fall before braking is started. As braking can be started in time, a high average braking force is achieved in relation to the maximum gripping force on the basis of which the strength properties of the safety gear have to be designed. The average braking force or deceleration is decisive in determining the safety gear size in relation to the elevator. Thus, the invention makes it possible to reduce the design strength of the safety gear, in other words, a smaller size and lower weight will be sufficient. Moreover, a low maximum force means that a low releasing force is achieved, which makes it easier to resume elevator operation after safety gear action.

The safety gear of the invention is suited for use in different types of elevator. The safety gear of the invention is of simple composition and plain construction and contains a small number of separate parts, so it is also cheap to manufacture.

As the structure of the safety gear helps prevent misalignment between the guide rail and the braking surface, it causes less wear of the guide rail and is also less liable to wear. A low maximum force also means less wear of the guide rail. As it is compact in construction and its functions are integrated in a small number of parts, the safety gear is very durable.

In the safety gear, the roller track comprises at least two levels differing from each other in gradient. A two-level roller track provides the advantage that the safety gear can be made to smaller external dimensions. The first, steeper gradient serves to eliminate the clearance between the friction surface and the guide rail. At this stage, the forces applied to the safety gear are small and do not yet produce actual braking. Because of the steep gradient, a large friction between the roller and the roller track is necessary. This is achieved e.g. by using a roller with a scalloped surface meeting a roller track that is definitely softer than the scalloping. On the second, more gentle gradient, the safety gear produces a steadily increasing braking force, which becomes a constant force once the roller has reached a stopper at the end of the track. When the roller meets the stopper, its rolling motion changes into rotation. Since, even after multiple times of gripping the guide rail, the safety gear must be able to produce about the same braking force, it is preferable that the contact surfaces between the roller and the roller track in the area of the second gradient should be hard and smooth, made e.g. of hardened steel, to ensure that they undergo no permanent deformations or wear that would affect the braking force. It is further advantageous to have a large contact area between the roller and the roller track because in that case the safety gear need not necessarily be provided with a separate roller guide. Since the contact surfaces in the area of the second gradient are smooth, their friction coefficient is lower as compared with the first gradient, which is why the second gradient must also have a gentler pitch angle.

BRIEF DESCRIPTION OF THE DRAWINGS

In the following, the invention is described in greater detail by the aid of a few examples of its embodiments, which in themselves constitute no restriction of the sphere of application of the invention, and by referring to the attached drawings, in which.

DETAILED DESCRIPTION OF THE PREFERRED EMBODIMENTS

Figure 1:
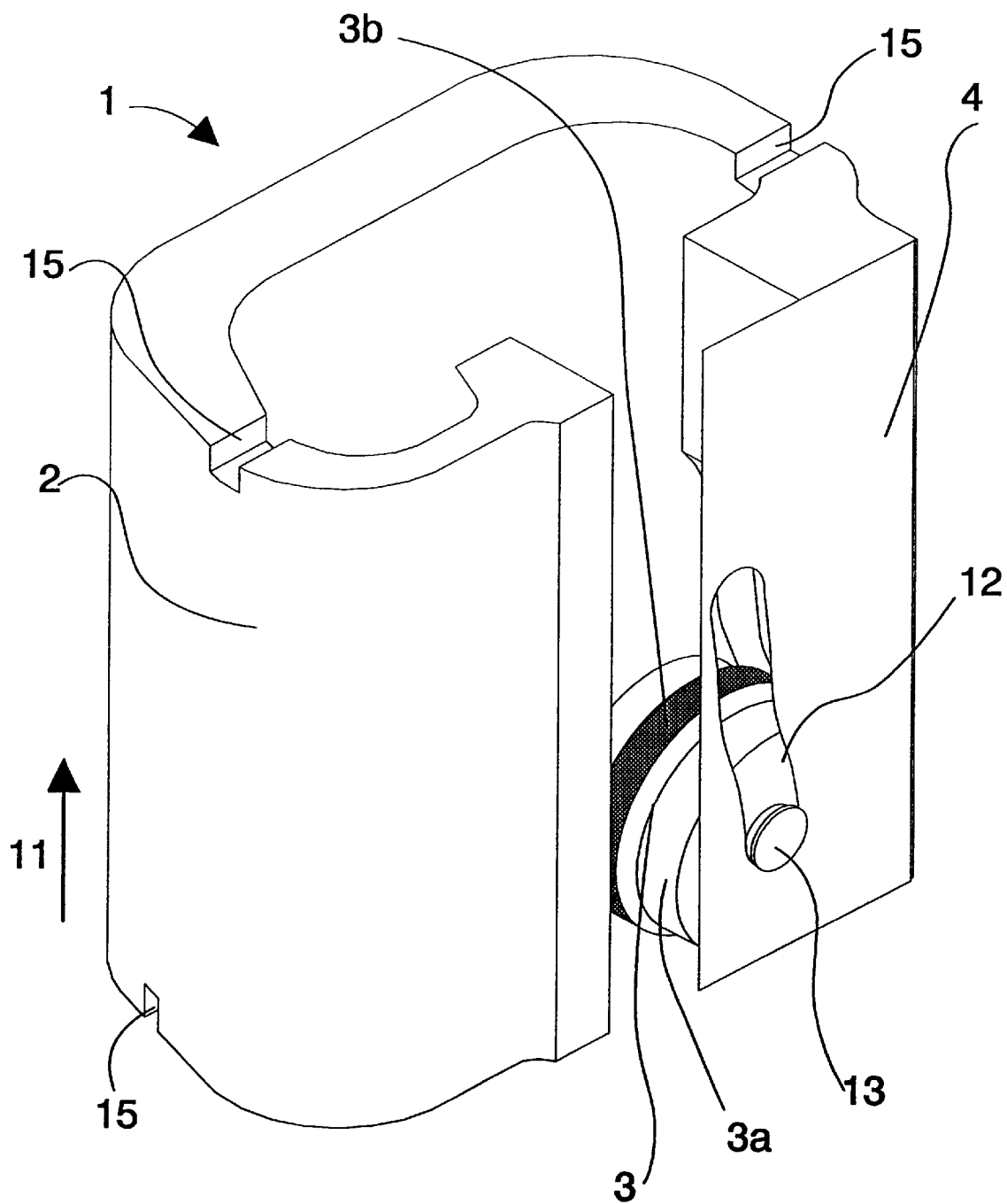
FIG. 1 presents a safety gear according to the invention.
Figure 2:
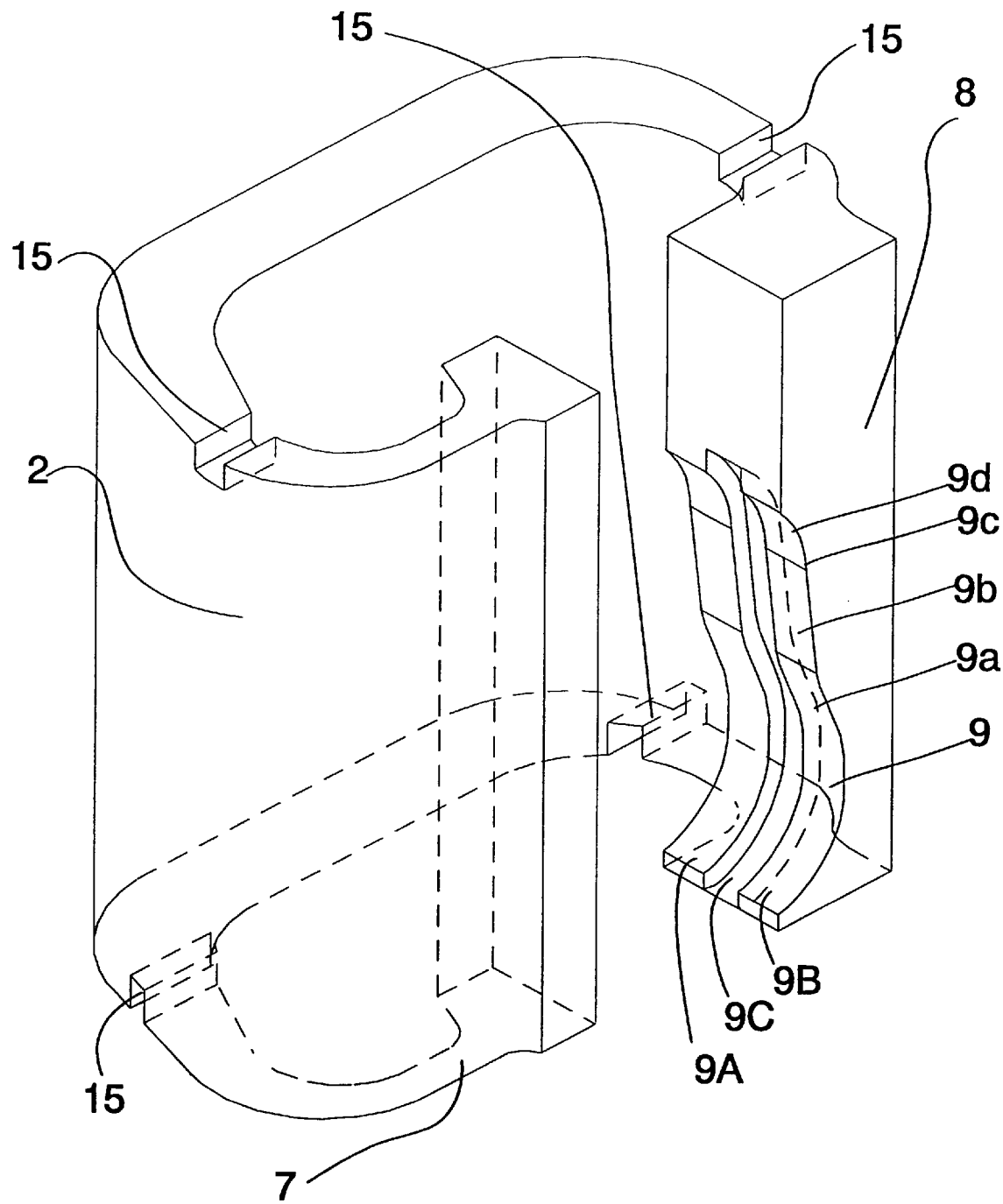
FIG. 2 presents a more detailed view of the frame of the safety gear in FIG. 1.
Figure 3:
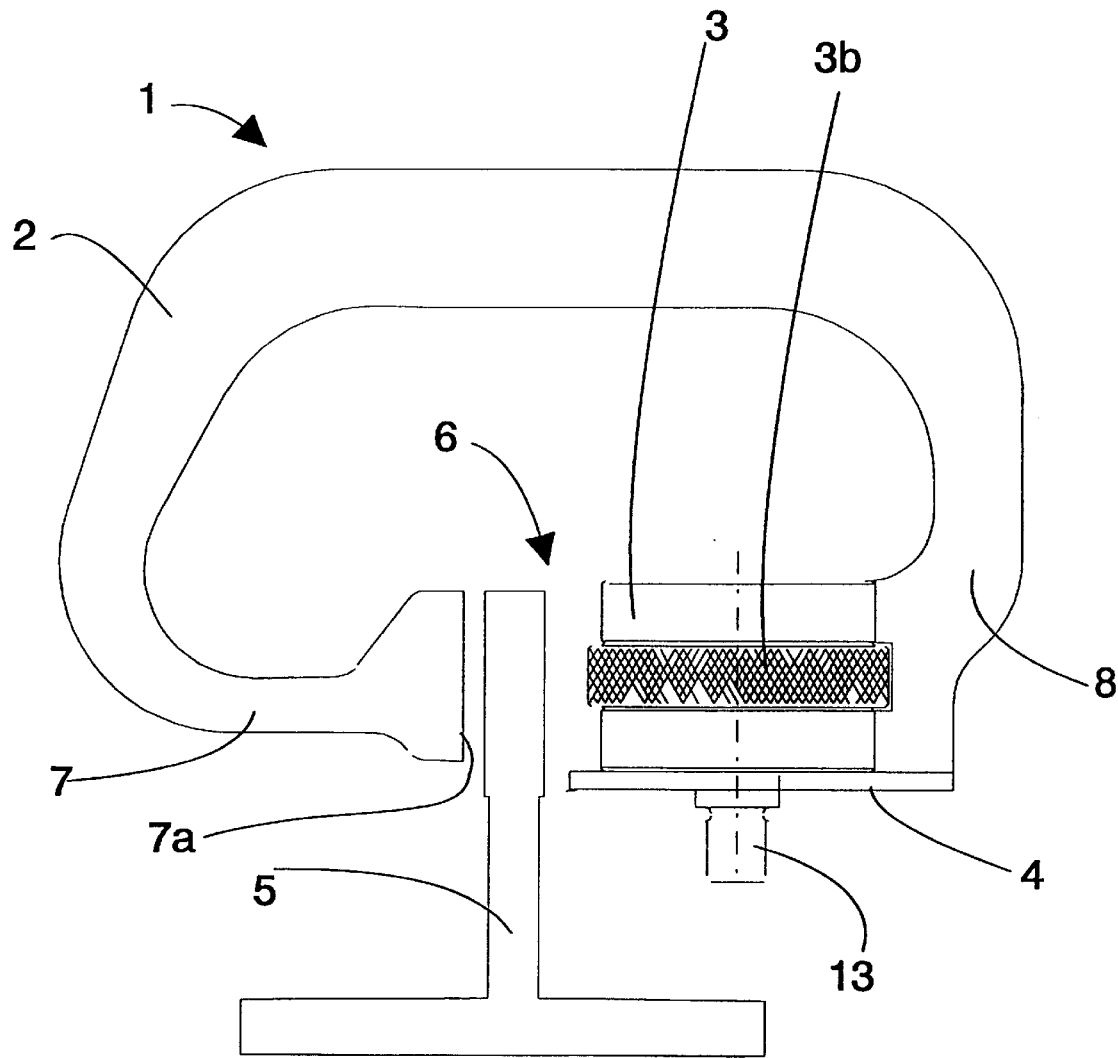
FIG. 3 presents a cross-section of the safety gear.

FIG. 1 presents a safety gear 1 applying the invention. The main parts of the safety gear 1 are a frame 2, a force element 3 and a guard 4 supporting and guiding the force element. A more detailed view of the frame 2 is shown in FIG. 2. FIG. 3 shows a cross-section of the safety gear 1. The elevator guide rail 5 is placed in the gap 6 of the safety gear. The frame 2 is a flexible body, made e.g. of spring steel or quenched and subsequently drawn steel, of a shape substantially resembling the letter C. The first jam 7 of the C-shaped frame is provided with a braking surface 7a, while the second jam 8 is provided with a force element. At least one of the jams 7, 8 is bent to the inside of the C-shape of the frame 2. Bending the jam to the inside of the C-shape compensates the tendency—resulting from the C-shape opening out—of the braking surface to turn so that it meets the guide rail at one edge only. The braking surface 7a on the first jam is either implemented as an integral part of the frame or it is part of a brake pad attached to the first jam. The braking surface is preferably an integral part of the frame 2. The force element 3 is a roller movable along a track 9 on the second jam 8. In a safety gear mounted in place, the elevator guide rail goes between the braking surface 7a and the roller. The roller 3 is held on the track 9 in the second jam 8 by the guard 4. The track 9 preferably has a curvilinear gradient at least in part of the path of the roller. The safety gear is activated by moving the roller along the sloping track 9 until it grips the guide rail. Although the track 9 can be implemented as a separate part attached to the frame, the track 9 is preferably integrated with the frame 2 and, in a further preferred case, the track 9 is machined directly in the second jam 8 of the frame 2. The upper and lower ends of the frame are provided with notches 15, by which the safety gear is fastened to a mounting structure in the elevator car or car frame.

Figure 6:
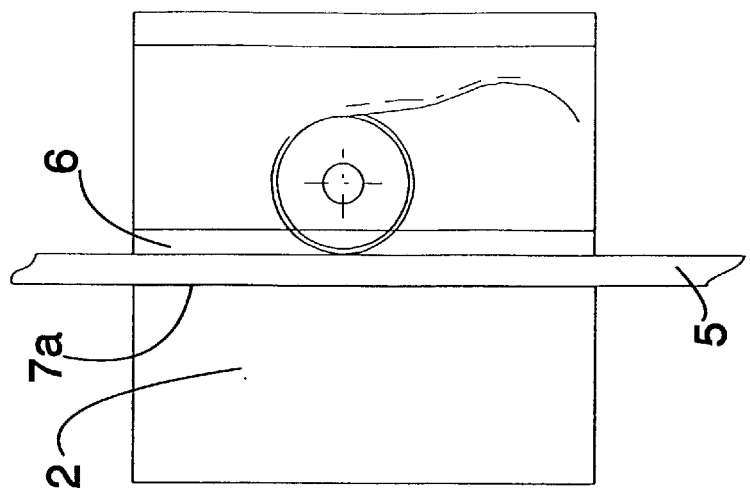
FIGS. 4–6 illustrate the operation of the safety gear during the gripping action.
Figure 5:
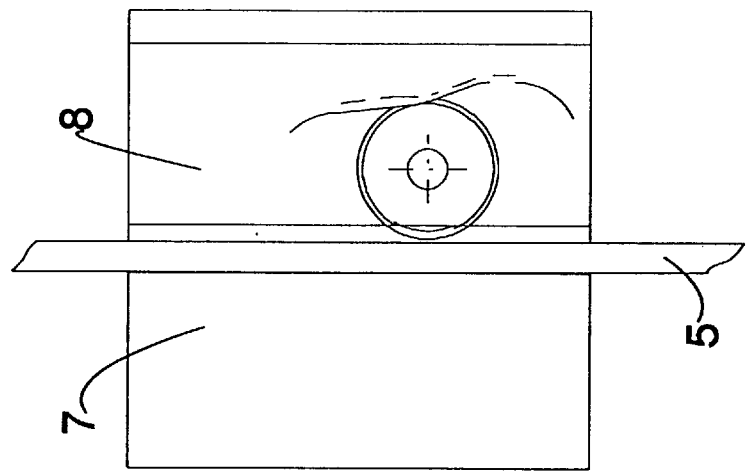
Figure 4:
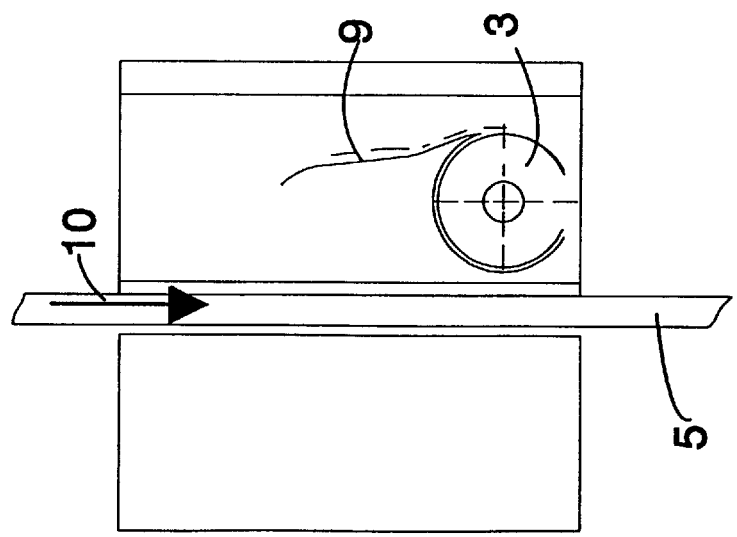

FIGS. 4, 5 and 6 present the safety gear 1 as seen from the direction of the gap between the jams 7, 8 of the C-shaped frame, illustrating the gripping process. A guide rail 5 fixed in the elevator shaft is in the gap. Normally, when the elevator is running up and down along the guide rails, there is no contact between the safety gear and the guide rail. In an overspeed situation, when the elevator is moving downward—the down direction is indicated by an arrow 10—or e.g. in a safety gear test, the safety gear grips the guide rail. The track 9 has a changing gradient, as is clearly shown in FIG. 2. The first part 9a of the track gradient, where a transmitting element connected to the overspeed governor of the elevator pulls the roller 3 upwards—the up direction being indicated by arrow 11—causing the roller to engage the guide rail, has a relatively large angle of inclination relative to the direction of the guide rail, preferably 15–25°. With an angle of about 20°, the faster safety gear action and reliable operation achieved by the invention are accomplished well enough to satisfy practical needs. If the first gradient is below 15°, e.g. 10°, safety gear action is faster than when no separate gradient for eliminating the clearance is used, but the speed advantage is still proportionally smaller. Via suitable selections relating to materials and surface quality, the pitch angle of the first gradient could be increased to above 30° and even to about 45°. However, very large pitch angles will make it more difficult to achieve a sufficient grip on both the guide rail and the track simultaneously. The middle part 9b of the track, where the roller moving on the track presses the guide rail between the roller and the braking surface, has a smaller angle of inclination, preferably 5–8°, most advantageously about 7°. If the pitch angle is very large, this might easily lead to a need to use, in the second gradient and in those parts of the roller that come into contact with it, surfaces having a lower wear resistance than that of the surfaces that would be needed if the pitch angle were smaller. On the other hand, a larger angle allows the maximum gripping force to be reached faster. The final compressive force applied by the safety gear to the guide rail is reached at the end of the middle part 9b. At this stage, the compressive force is generally at a maximum. After the middle part 9b there is a short even part or third gradient 9c, where the track is roughly parallel to the guide rail. At the end of the track there is a roller stopper or fourth gradient 9d, which in a braking situation keeps the roller in a specified position in the longitudinal direction of the safety gear 1, preferably about midway between the ends of the safety gear. A preferred shape of the stopper 9d is one that provides support for the roller over a large area, for instance a concave cylinder sector surface having the same radius of curvature as the rolling surface 3a of the roller 3 has. To allow a better grip on the guide rail 5, the roller 3 may be provided with a roughened surface or a surface pattern raised from the roller surface. The roller 3 is definitely harder than the surface of the guide rail 5, at least in this roughened or patterned area, so that even a moderate surface pressure will produce an excellent grip on the guide rail. Typically, the hardness of the guide rail is in the range of 180 HB (Brinell scale) and the hardness of a hardened steel roller is in the range of 55–65 HRC (Rockwell C scale). For instance, from tool steel it is easy to make a roller whose surface can be further case hardened to about 58 HRC. The roller is preferably at least somewhat harder than the second gradient and much harder than the guide rail and the first gradient. In practice, the safety gear friction surface engaging the guide rail is of the same order of hardness as the surface of the roller and the second gradient. Such a roughened area or surface pattern raised from the roller surface is preferably implemented as a ring-shaped bossage 3b in the middle of the cylindrical surface of the roller, dividing its rolling surface 3a into two parts. The bossage 3b is preferably a substantially cylindrical surface coaxial with the rolling surface 3a and larger than the latter in diameter. The sides of the track 9 that meet the roller 3 during actual braking form two parallel sub-tracks 9A, 9B with a cut-out 9C between them in which the bossage is to run. In the first part 9a of the track, the cut-out has a depth smaller than the height of the bossage 3b, but in the final part 9b, 9c, 9d of the track it has a depth larger than the height of the bossage. This cut-out can also act as a guide groove which guides the roller in the lateral direction by its bossage 3b. Thus, in the first part 9a of the track, the roller 3 is supported by the cut-out via the ring-like bossage 3b, which preferably has a roughened surface, while in the rest 9b, 9c, 9d of the track 9 it is supported by the parallel sub-tracks 9A, 9B via its smooth rolling surface 3a.

FIGS. 4–6 illustrate the gripping process. In FIG. 4, the roller is still in its low position. The long guide hole 12 in the guard 4 (shown in FIG. 1) keeps the roller 3 in position at the lower end of the track 9. The roller is supported on the guard by its journal 13, which is placed in the guide hole 12. In FIG. 5, the roller 3 has ascended along the first part 9a of the track 9, which acts as a first gradient, to the middle part 9b, which acts as a second gradient, where the roller movement presses the guide rail 5 more and more tightly between the roller 3 and the braking surface 7a. Thus, the primary function of the first gradient in the operation of the safety gear is to eliminate the clearance between the guide rail and the friction surface of the safety gear and the function of the second gradient is to increase the gripping force. At the end of the first gradient, the transition to the second gradient can also be so implemented that the roller meets the bottom of the cut-out for a short time at the beginning of the second gradient. Preferably the first part 9a of the track at least in the cut-out 9C is made of a softer material than the ring-like bossage 3 of the roller. In this way, the roller will properly engage the track via its roughened or scalloped surface. As the roller 3 is in contact with both the guide rail and the track at least when approaching the next part 9b of the track, the rotation of the roller between the guide rail and the track ensures that the roller will climb up along the first part 9a of the track to the next part 9b. When the roller moves from the first part 9a to the next part 9b of the track, the point of contact between the roller and the track changes from the cut-out 9C to the parallel sub-tracks 9A, 9B. In FIG. 6, the roller has already reached the stopper 9d, where the roller can rotate. The roller presses the guide rail 5 against the braking surface 7a with full force. At the same time, the friction between the roller 3 and the frame 2 brakes the rotation of the roller in the stopper 9d. Thus, at the final stage of the gripping process, a dual braking action occurs in the safety gear, viz., on the one hand, as the braking surface 7a is sliding along the guide rail 5 and, on the other hand, as the roller 3 is rotating in the stopper 9d. In the final parts 9b, 9c, 9d of the track, the sub-tracks 9A, 9B must be hard and smooth because of the high surface pressure applied to the track by the roller 3; this applies especially to the stopper 9d. Otherwise there is a risk of fast wear of the track.

Figure 7:
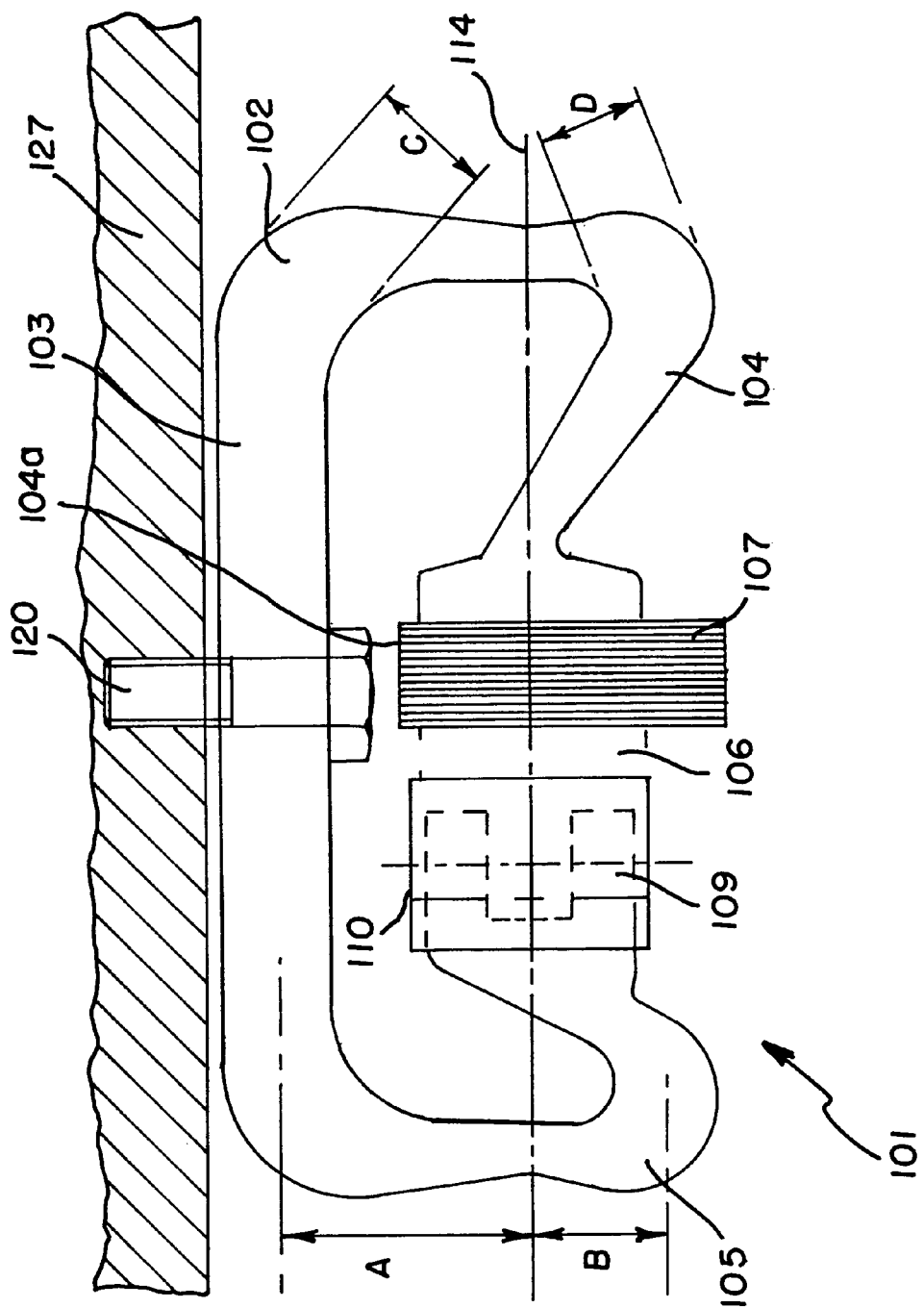
FIGS. 7–9 present another embodiment of the invention.
Figure 8:
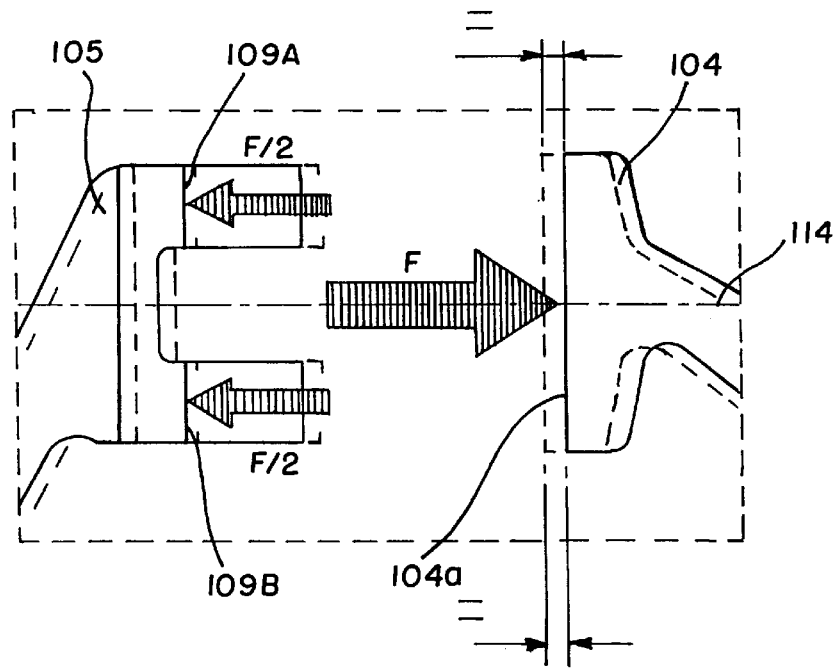
Figure 9:
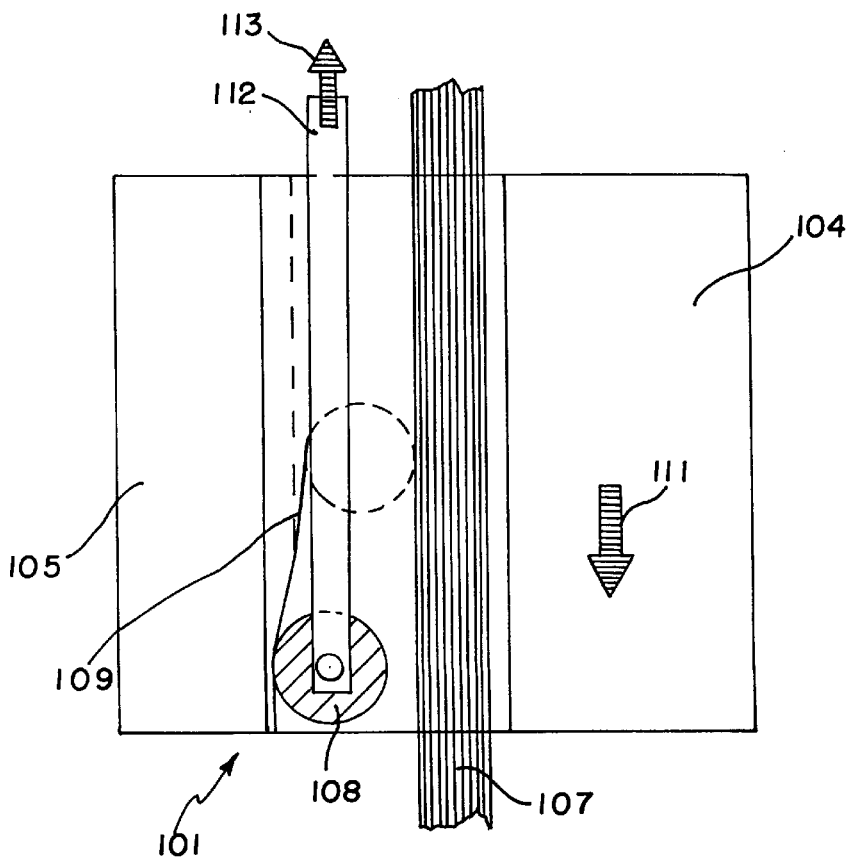

FIGS. 7–9 present another safety gear applying the invention. FIG. 7 shows a cross-section of the safety gear 101 and especially its frame 102. The cross-section is substantially the shape of the letter C. In cross-section, the back 103 of the C-shape is thicker than its jams 104, 105. Inside the C-shape, at the ends of the jams 104, 105 and between them, is a hollow 106 housing a roller, which, when the safety gear is activated, is pressed against an elevator guide rail 107, thus acting as a force element. The safety gear 101 is attached by its back 103 with a bolt 120 or other suitable means to a load-bearing part 121 of the elevator car or counterweight.

The safety gear 101 starts braking when the force element, which in FIG. 9 is a roller 108, is brought into contact with the guide rail 107. When the force element meets the guide rail, it will move up along the track 109, getting more and more tightly crammed between the guide rail and the second jam 105, until finally the guide rail is squeezed between the force element engaging the rail from its second side and the braking surface 104a engaging the rail from its first side. As a result of the force element 108 being forced up along its track, the jams 104, 105 of the safety gear 101 move farther apart from each other; the C-shape tends to open out, as it were. The line 114 of application of the force producing this opening movement of the jams passes through the braking surface 104a in a substantially perpendicular direction. This line 114 of application of the force also passes through the inside of the C-shape of the cross-section of the safety gear so that the back 103 of the C-shape remains on one side of the line while the jams 104, 105 of the C-shape remain on the other side, at least partially. The gripping force of the safety gear consists of the frictional force acting via the braking surface 104a and, on the other hand, when the force element 108 is active. The force element 108 is placed in a box-like guide support 110, which also supports the force element to keep it in position. FIG. 8 presents a detail of the cross-section, showing the force components resulting from the movement of the force element and producing an opening effect on the C-shape. The frictional force braking the elevator is proportional to the force tending to open the C-shape. In the first jam 104, the effect of the force element produces a force F applied to the braking surface 104a in the direction of the line 114. In the second jam, the force element is supported by a track consisting of two parallel sub-tracks 109A, 109B, with a supporting force acting in a direction opposite to force F. In a preferred case, the components of the supporting force applied to the adjacent sub-tracks 109A, 109B are of equal magnitude and therefore their magnitudes are F/2. The gradients of the sub-tracks may differ somewhat from each other. In the second jam the force element is supported. Since the safety gear frame acts as a spring, force F is substantially proportional to the displacement by which the C-shape opens out. The degree of the opening movement of the frame 102 and, on the other hand, the degree of bending of the jams 104, 105 to the inside of the C-shape are adjusted by selecting the thicknesses of the various parts of the frame, e.g. the thicknesses C and D of the bends of jam 104, and via the design of the C-shape and its parts and the position of the line of application of the force. The design should be such that line of application of the force passes through the thinner parts of the jams in a direction parallel to the back 103.

FIG. 9 presents the safety gear 101 as seen from the direction of the gap between the jams 104, 105 of the C-shape. In the gap is a guide rail 107 fixed in place in the elevator shaft. Normally, when the elevator is travelling up and down along the guide rails, there is no contact between the safety gear and the guide rail. In an overspeed situation, when the elevator is moving down—the down direction is indicated by arrow 111—or e.g. in a safety gear test, the safety gear grips the guide rail. The force element is a roller 108. The track 109 has a changing gradient. The first part of the track gradient, where a transmitting element 112 connected to the overspeed governor of the elevator pulls the roller 108a upwards—the up direction being indicated by arrow 113—causing the roller to engage the guide rail, has a relatively large angle of inclination relative to the direction of the guide rail, preferably 10–11°. The middle part of the track, where the roller moving on the track presses the guide rail between the roller and the braking surface, has a smaller angle of inclination, preferably 5–8°. The final compressive force applied by the safety gear to the guide rail is reached at the end of the middle part. At the end of the track there is a roller stopper, which in a braking situation keeps the roller in a specified position in the longitudinal direction of the safety gear 101, preferably about midway between the ends of the safety gear. A preferred shape of the stopper is one that provides support for the roller over a large area, for instance a concave cylinder sector surface having the same radius of curvature as the rolling surface of the roller has.

Figure 10:
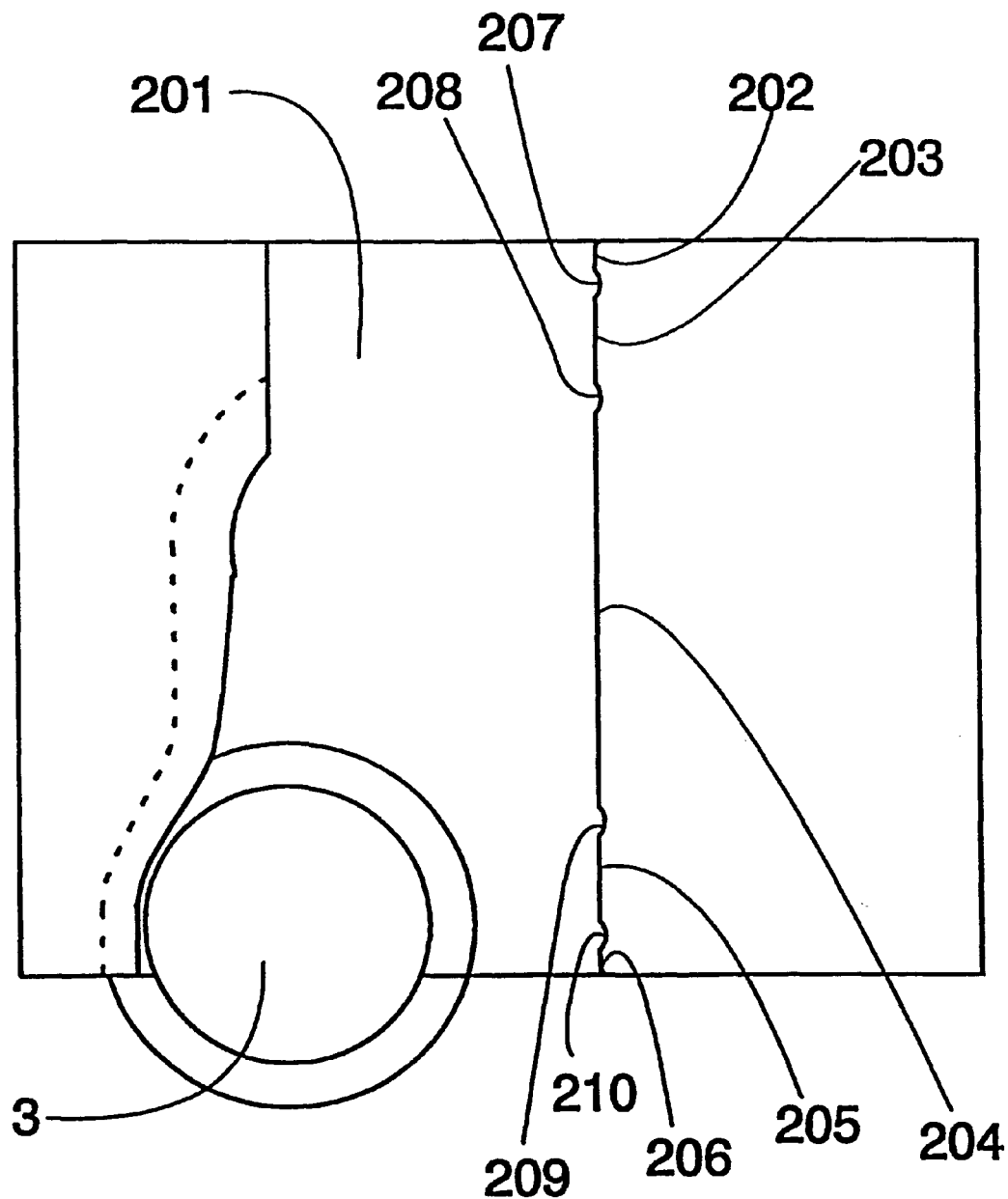
FIG. 10 presents another safety gear applying the invention.

FIG. 10 presents a safety gear 201 like the one depicted in FIGS. 1–6. The braking surface of the safety gear that is pressed against the guide rail is divided into a number of successive sub-surfaces 202, 203, 204, 205, 206 by transverse grooves 207, 208, 209, 210. If the elevator is provided with sliding guides, the guide rail may be very greasy. In this case, the grease may retard the beginning of the braking. The transverse grooves allow the grease to escape from between the braking surface and the guide rail during safety gear operation, resulting in faster gripping.

Figure 13:
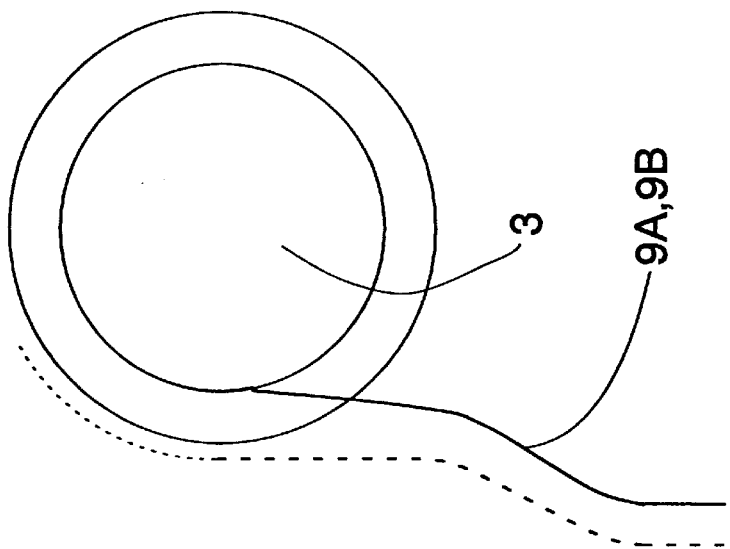
FIGS. 11–13 present a detail relating to safety gear operation as illustrated by FIGS. 4–6.
Figure 12:
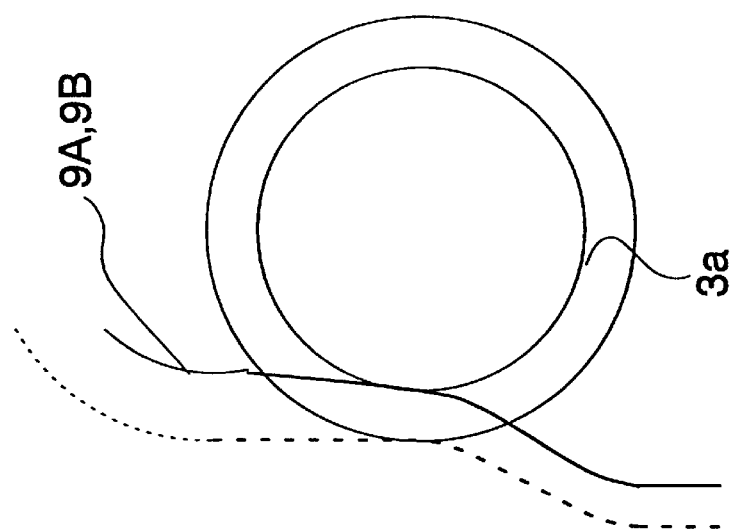
Figure 11:
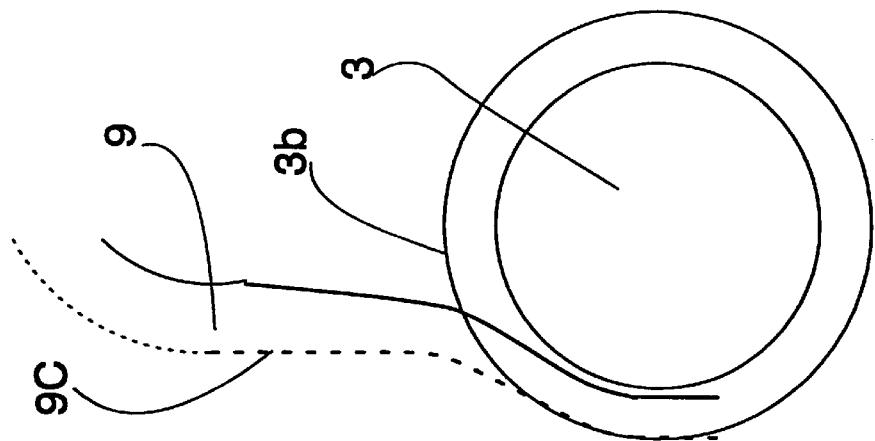

FIGS. 11–13 give a detailed illustration of the motion of the roller 3 along the track 9 in a gripping process as presented in FIGS. 4–6. In FIG. 11, the thrust of the roller 3 is received via the bossage 3b in the roller surface by the bottom 9C of the cut-out in the track 9. To achieve a better engagement between the guide rail 5 and the roller 3, the roller may be provided with a roughening or patterning raised from the roller surface to ensure a secure grip on the relatively soft surface of the first part of the track.

In FIG. 12, the roller is moving from a steep-gradient part of the track to a part with a gentler gradient. At the same time, the roller 3 is disengaged from the track bottom 9C and is from then on supported by the subtracks 9A, 9B beside the cut-out. The roller now has track contact via its rolling surface 3a.

In FIG. 13, the roller has reached the end of the track 9, which is so shaped as to stop the roller while permitting it to rotate. The roller is pressed against the guide rail and the stopper with full force. In the stopper, the friction between the roller 3 and the track 9 has a braking effect on the rotation of the roller.

In the latter parts of the track, the surface receiving the rolling surface of the roller is harder. There are various methods to make a track with different degrees of hardness in different parts of it. For instance, heat treatment can be used to soften desired parts of a hardened track. It is possible to harden only certain parts of the track to make them harder than the rest. There are also various ways of applying a hardness increasing surface treatment to desired parts of the track. Another possibility is to assemble the track from parts of different degrees of hardness. The roughening or patterning raised from the surface of the roller is preferably implemented as a ring-shaped bossage 3b in the middle of the cylindrical surface of the roller, dividing the rolling surface 3a into two parts.

It is obvious to the person skilled in the art that different embodiments of the invention are not limited to the examples described above but may instead be varied in the scope of the claims presented below.

What is claimed is:

1. A safety gear comprising a frame provided with a braking surface, which, when the safety gear is braking, is pressed against a first guide surface of a guide rail, a roller being mounted in the frame and being fitted to move along a track provided in the safety gear, said track comprising at least a first gradient and a second gradient, the first gradient having a larger pitch angle than the second gradient, which roller is pressed against a second guide surface of the guide rail when the safety gear is braking, a friction coefficient between the roller and the track being higher on the first gradient than on the second gradient.

2. The safety gear as defined in claim 1, wherein the roller meets the track on the first gradient and on the second gradient via different parts.

3. The safety gear as defined in claim 2, wherein the parts of the roller that meet the track on the first gradient and on the second gradient differ from each other in diameter.

4. The safety gear as defined in claim 1, wherein the part of the roller that meets the track on the first gradient is roughened, scalloped or provided with a patterning raised from the roller surface.

5. The safety gear as defined in claim 1, wherein the part of the roller that meets the track on the first gradient is larger in diameter than the cylindrical surface of the roller, and the roller meets the second guide surface of the guide of the guide rail via this larger part.

6. The safety gear as defined in claim 1, wherein the part of the track that meets the roller on the first gradient is softer than a part that meets the roller on the second gradient.

7. The safety gear as defined in claim 6, wherein the roller is substantially as hard or harder than the second gradient and substantially harder than the guide rail or the first gradient.

8. The safety gear as defined in claim 6, wherein the friction surface of the safety gear that meets the guide rail is substantially as hard as the surface of the roller and the second gradient.

9. The safety gear as defined in claim 1, wherein the flexible frame is made of steel.

10. The safety gear as defined in claim 9, wherein the flexible frame is made from spring steel or quenched and subsequently drawn steel.

11. The safety gear as defined in claim 1, wherein the roller track has a curvilinear gradient at least in part of the path of the roller.

12. The safety gear as recited in claim 6, wherein the part of the track that meets the roller on the first gradient is a first track part and wherein the part of the track that meets the roller on the second gradient is a second track part, the first track part including two tracks with the second track part being therebetween.

13. The safety gear as recited in claim 12, wherein the second track part is a cut-out between the two tracks of the first track part.

14. The safety gear as recited in claim 13, wherein the second track part has a depth with varies, in an area where the roller meets the second track part on the first gradient, the depth of the second track part being less than the depth in an area where the roller meets the first track part on the second gradient.

15. The safety gear as recited in claim 1, wherein the track comprises four gradients which include the first gradient and the second gradient.

16. The safety gear as recited in claim 15, wherein one of the four gradients is generally parallel to the guide rail.

17. The safety gear as recited in claim 1, further comprising a third gradient for the track, the third gradient being generally parallel to the guide rail.

18. The safety gear as recited in claim 1, wherein the roller is engaged with the guide rail when at a part of the track having the first gradient and when at a part of the track having the second gradient.

* * * * *